United States Patent

Naka et al.

[11] Patent Number: 5,995,480
[45] Date of Patent: Nov. 30, 1999

[54] ROTARY DRIVING DEVICE HAVING A SURFACE VIBRATION ABSORBER PART WITH A VARYING THICKNESS

[75] Inventors: Hiroyuki Naka, Osaka; Naoko Matsuda, Hirakata; Shigeru Ohki, Habikino; Mikio Hirano, Tondabayashi, all of Japan

[73] Assignee: Matsushita Electric Industrial Co., Ltd., Osaka-fu, Japan

[21] Appl. No.: 08/779,622

[22] Filed: Jan. 7, 1997

[51] Int. Cl.$^6$ .................................................. G11B 25/04
[52] U.S. Cl. ............................................................ 369/263
[58] Field of Search .................................... 369/263–264, 369/270–271, 247

[56] References Cited

U.S. PATENT DOCUMENTS

| | | | |
|---|---|---|---|
| 4,054,291 | 10/1977 | Maeda | 369/263 |
| 4,535,438 | 8/1985 | Massarelli et al. | 369/264 |
| 4,841,516 | 6/1989 | Ohmori et al. | 369/264 |
| 5,216,664 | 6/1993 | Sleegers et al. | 369/271 |
| 5,258,972 | 11/1993 | Brasfield et al. | 369/263 |

FOREIGN PATENT DOCUMENTS

| | | | |
|---|---|---|---|
| 61-9801 | 1/1986 | Japan | 369/264 |
| 63-48679 | 3/1988 | Japan | 369/264 |
| 63-78387 | 4/1988 | Japan | 369/264 |
| 1-30001 | 1/1989 | Japan | 369/264 |
| 4-125845 | 4/1992 | Japan | 369/264 |

Primary Examiner—Brian E. Miller
Attorney, Agent, or Firm—Wenderoth, Lind & Ponack, L.L.P.

[57] ABSTRACT

A rotary driving device for rotating an object to be rotated, is manufactured by a process of rotating a turntable, for loading the object to be rotated thereon, mounted to a driving part and thereby generating a surface vibration because of rotation of the turntable, and a process of forming a surface vibration absorber part on the turntable corresponding to an amount of the surface vibration.

48 Claims, 11 Drawing Sheets

ROTARY DRIVING DEVICE HAVING A SURFACE VIBRATION ABSORBER PART WITH A VARYING THICKNESS

BACKGROUND OF THE INVENTION

The present invention relates to a rotary driving device such as a spindle motor or the like for objects to-be-rotated including recording media, e.g., CD-ROMs and MO (magneto-optic) discs, and manufacturing method and device for the rotary driving device.

A spindle motor (an example of the rotary driving device referred to above) is used was a driving device for circular recording media like CD-ROMs, MO discs, etc. The spindle motor is generally a DC type brushless motor and is driven for rotation at a high velocity of several hundreds to several thousands rpm. The spindle motor of this kind includes a turntable for loading a recording medium (an example of the object to be rotated) thereon, and a driving part for rotating the turntable. The driving part comprises a motor frame, a rotor supported to the motor frame in a rotatable fashion, and a stator disposed in the periphery of a rotary shaft of the rotor within the motor frame. The turntable is set integrally with the rotor and a central portion of which has fixed thereon the rotary shaft of the rotor, for example, by way of press-fitting.

The spindle motor is controlled to be driven for rotation at a constant linear velocity (CLV) when driving the CDs or CD-ROMs. Additionally, it is controlled to be rotated with a constant number of revolution (CAV) when driving MO discs.

In manufacturing the above spindle motor, it is important to restrict the vibration of waving of a surface of the turntable within a tolerance zone. The surface vibration in the spindle motor during the rotation leads to a surface vibration of the recording medium, causing a change in distance from a writing and reading head located adjacently to the recording medium, thereby hindering the head from correctly writing and reading to the recording medium. The surface vibration is often due to the press-fitting when the rotary shaft is press-fitted to the turntable or to the assembling of individual components in the spindle motor. More specifically, the surface vibration results, for instance, from a slight difference of the pressing force at the time of press-fitting or a small burr left in a to-be-pressed hole, etc. Therefore, the surface vibration generated during the rotation differs for every spindle motor. The prior art has intended to maintain a high processing accuracy and a high assembling accuracy of each component so as to reduce the above-described surface vibration as much as possible. However, as the processing accuracy and assembling accuracy are enhanced, manufacturing costs are increased thus making the spindle motor expensive.

SUMMARY OF THE INVENTION

Accordingly, an object of the present invention is to provide a rotary driving device for driving objects to-be-rotated and a manufacturing method and a device for manufacturing the rotary driving device. Also, the rotary driving device is capable of restricting a surface vibration within a tolerance zone at low cost.

In accomplishing these and other aspects, according to a first aspect of the present invention, there is provided a rotary driving device for rotating an object to be rotated, comprising: a turntable, a driving part and a surface vibration absorber.

The turntable is for loading the object to be rotated.

The driving part is for rotating the turntable.

The surface vibration absorber part is formed with an irregular thicknesses in a peripheral direction at of a peripheral edge on the turntable.

According to a second aspect of the present invention, there is provided a rotary driving device according to the first aspect, wherein the surface vibration absorber part is formed in irregular thicknesses corresponding to surface vibration on the turntable because of rotation of the turntable.

According to a third aspect of the present invention, there is provided a rotary driving device according to the first aspect, wherein the object to be rotated is a recording medium for recording data, and the driving part is a motor for rotating the recording medium.

According to fourth and fifth aspects of the present invention, there is provided a rotary driving device according to the first and second aspects, wherein the surface vibration absorber part is a body molded of an elastic resin in a predetermined shape with thicknesses corresponding to amounts of the surface vibration.

According to sixth, seventh, and eighth aspects of the present invention, there is provided a rotary driving device according to the first, second, and fourth aspects, wherein the surface vibration absorber part is a coating film formed by applying a liquid in thicknesses corresponding to the amounts of the surface vibration.

According to ninth, tenth, eleventh, and twelfth aspects of the present invention, there is provided a rotary driving device according to the first, second, fourth, and fifth aspects, wherein the surface vibration absorber part is formed like a ring along the peripheral edge of the turntable thereon.

According to 13th, 14th, 15th, and 16th aspects of the present invention, there is provided a rotary driving device according to the first, second, fourth, and fifth aspects, wherein the surface vibration absorber part is constituted of two parts disposed apart a space along the peripheral edge of the turntable thereon.

According to a 17th aspect of the present invention, there is provided a rotary driving device according to the third aspect, wherein the surface vibration absorber part has function to prevent the recording medium from sliding.

According to an 18th aspect of the present invention, there is provided a method of manufacturing a rotary driving device for rotating an object to be rotated.

The first step includes a process of rotating a turntable, for loading the object to be rotated thereon, mounted to a driving part and thereby generating a surface vibration because of rotation of the turntable.

The second step includes a process for of forming a surface vibration absorber part on the turntable corresponding to an amount of the surface vibration.

According to a 19th aspect of the present invention, there is provided a method of manufacturing a rotary driving device for rotating an object to be rotated, according to the 18th aspect, further comprising, before the rotating process, a process of mounting the turntable to the driving part.

According to a 20th aspect of the present invention, there is provided a method of manufacturing a rotary driving device, according to the 18th aspect, wherein the process of forming the absorber part includes several other steps.

The first includes a process of filling an elastic resin liquid into a mold having a ring-shaped groove and forming a half-set resin ring.

The second step includes a process of transferring the resin ring onto the turntable in a registered state.

The third includes a process of adjusting a thickness of the half-set resin ring correspondingly to the amount of the surface vibration by way of pressing the ring by a reference rotary disk a surface vibration of which is restricted within a tolerance zone.

According to a 21st aspect of the present invention, there is provided a method of manufacturing a rotary driving device, according to the 18th aspect, wherein the process of forming the absorber part includes several other steps.

The first step includes a process of measuring the amount of the surface vibration when the turntable is rotated.

The second step includes a process of applying a liquid on the turntable while changing an application thickness correspondingly to a measured amount of the surface vibration.

According to a 22nd aspect of the present invention, there is provided a method of manufacturing a rotary driving device, according to the 21st aspect, wherein the process of applying the liquid includes a process of applying the liquid with use of an inkjet nozzle discharging the liquid intermittently in a noncontact state to the object to be rotated.

According to 23rd and 24th aspects of the present invention, there is provided a method of manufacturing a rotary driving device, according to the 21st and 22nd aspects, wherein the process of applying the liquid along a peripheral edge of the turntable into a thickness corresponding to the amount of the surface vibration.

According to 25th and 26th aspects of the present invention, there is provided a method of manufacturing a rotary driving device, according to the 21st and 22nd aspects, wherein the process of applying the liquid includes a process of applying the liquid via a space in a peripheral direction on the turntable into a thickness corresponding to the amount of the surface vibration.

According to a 27th aspect of the present invention, there is provided a method of manufacturing a rotary driving device for rotating an object to be rotated.

The first step includes using a device for rotating a turntable, for loading the object to be rotated thereon, mounted to a driving part and thereby generating a surface vibration because of rotation of the turntable.

The second step includes using a device for forming a surface vibration absorber part on the turntable corresponding to an amount of the surface vibration.

According to a 28th aspect of the present invention, there is provided a method of manufacturing a rotary driving device for rotating an object to be rotated, according to the 27th aspect, wherein the device for forming the absorber part includes a device for measuring and a device for applying a liquid.

The device for measuring is used to measure the amount of the surface vibration when the turntable is rotated.

The device for applying a liquid is used to apply a liquid on the turntable while changing an application thickness correspondingly to a measured amount of the surface vibration.

According to the aspects, since the surface vibration absorber part is formed on the turntable, the surface vibration or waving can be restricted within a tolerance zone even when individual components constituting the turntable and the driving part are not so accurately processed or assembled. The surface waving is accordingly limited within the tolerance zone at low cost.

When the surface vibration absorber part has a function to prevent the recording medium from sliding, this one member of the absorber part fulfills both a slide prevention function and a surface vibration prevention function.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Preferred embodiments of the present invention will be described hereinbelow with reference to the accompanying drawings.

Figure 1:
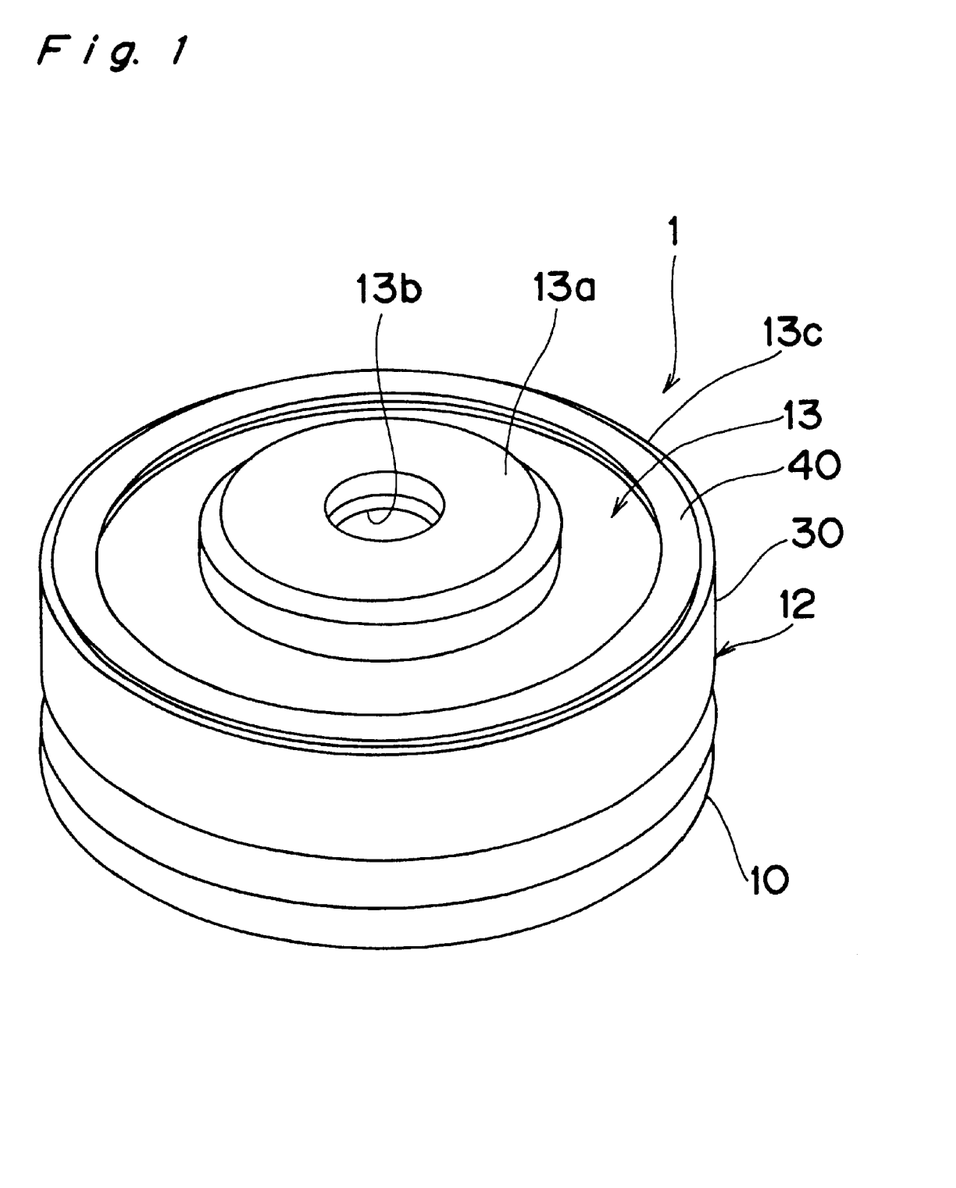
FIG. 1 is a perspective view of a spindle motor according to one embodiment of the present invention.
Figure 2:
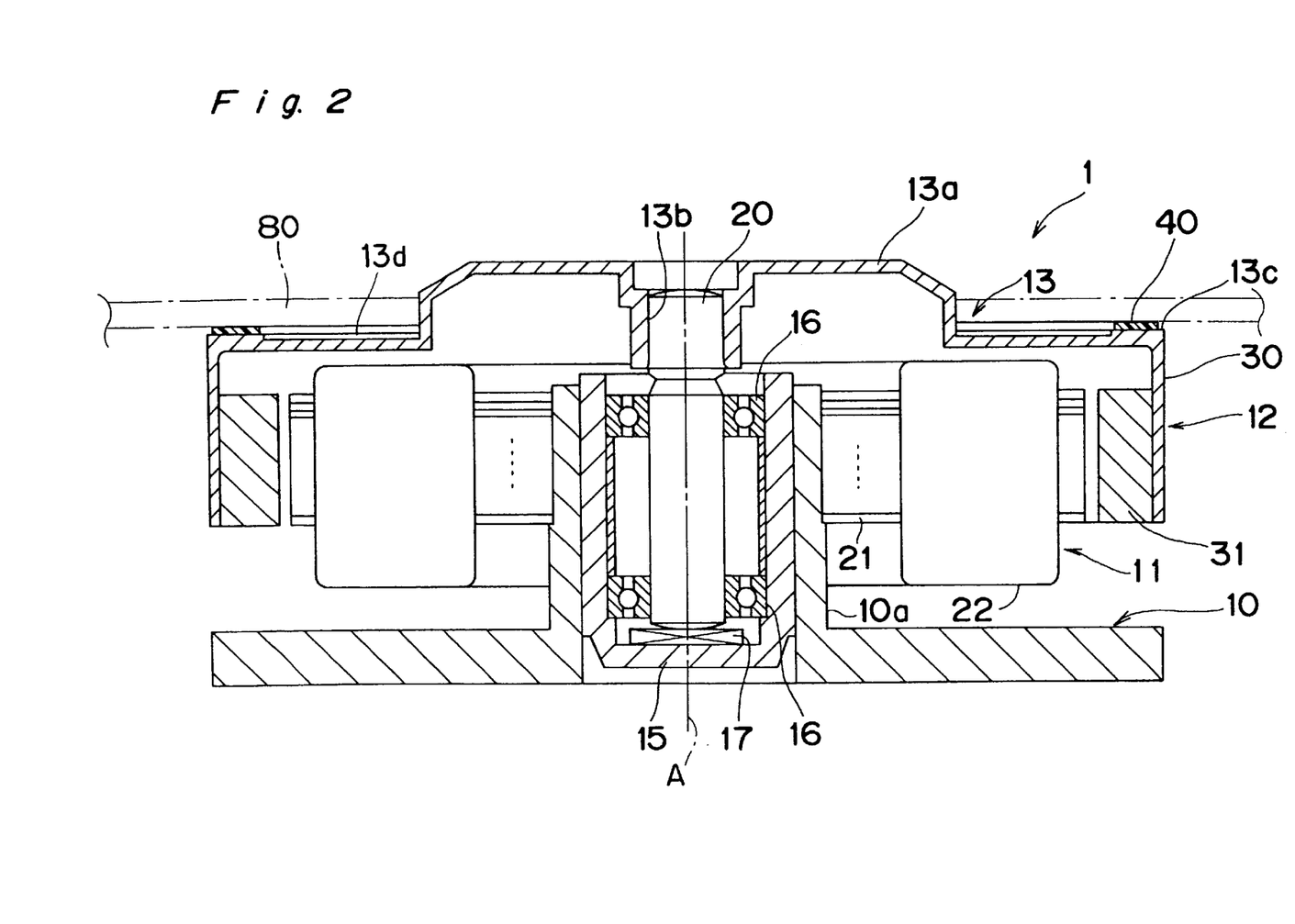
FIG. 2 is a longitudinal sectional view of the spindle motor in FIG. 1.

Referring to FIGS. 1 and 2, a spindle motor 1 according to one embodiment of the present invention is used, for example, as a driving part in an optical disc driving device and is a DC brushless motor. The spindle motor 1 has a base bracket 10 a stator 11 fixed to the base bracket 10, a rotor 12 supported by the base bracket 10 in a rotatable manner, and a turntable, 13 rotatable on an axis of rotation A, on which an optical disk 80 as an object to be rotated is placed.

The base bracket 10 is in the form of a flanged cylinder. A bottom cylindrical bearing case 15 is fitted in the inner periphery of a cylindrical part 10a of the bracket 10 in a manner not to be allowed to rotate. A rotary shaft 20 is set at a central part of the bearing case 15, with a front end thereof faced up. A pair of upper and lower portions separated a distance inside the bearing case 15. A thrust plate 17 is disposed at a central part of a bottom face of the bearing case 15. The bearings 16 and the thrust plate 17 connect the rotary shaft 20 to the bearing case 15 in a rotatable and axially immovable state. The bearings may be noncontact bearings such as fluid bearings or the like, instead of the contact bearings as above.

The stator 11 has a core 21 fixed to the outer periphery of the cylindrical part 10a of the base bracket 10, and a winding 22 wound around the stator core 21. The rotor 12 has a cylindrical rotor frame 30, and a rotor magnet 31 secured to the rotor frame 30. The rotor frame 30 is arranged at the side of the outer periphery of the stator 11. The rotor magnet 31 is arranged at the side of the inner periphery of the rotor frame 30 to face the stator 11.

The turntable 13 is formed in one body with the rotor frame 30 in a manner to shut an upper end of the rotor frame 30. The turntable 13 is a disk-like member having a top surface 13d, a circular projection 13a to be engaged with a center hole of the optical disc 0 at a central part thereof, and a mounting hole 13b for press-fitting the rotary shaft 20 into a central part of the projection 13a. An annular surface vibration absorber layer (or shift absorber part) 40 formed of a set elastic resin is tightly secured to a peripheral edge 13c of the turntable 13.

Since the surface vibration absorber layer 40 is formed of the elastic resin, the layer functions to absorb a surface vibration as well as functions to absorb a surface vibration as well as functions to prevent the optical disc from sliding or slipping on the turntable. The surface vibration absorber layer 40 is formed into a thickness corresponding to the amount of the surface vibration after the spindle motor 1 is assembled. In selecting a photosetting resin used for the surface vibration absorber layer 40 a resin having elasticity and set by ultraviolet rays as "RL-2659" (trade name by Sanyu Rezin Kabushiki Kaisha), etc. is preferred.

A manufacturing method for the spindle motor 1 according to the embodiment of the present invention will now be described below.

The base bracket 10, stator 11, and rotor 12 are prepared. The bearing case 15 is fitted in the base bracket 10 beforehand. The rotary shaft 20 is attached to the bearing case 15 beforehand.

Then, the stator 11 is set in the outer periphery of the cylindrical part 10a of the base bracket 10 and thereafter, the rotary shaft 20 is press-fitted to the turntable 13. At this time, the rotary shaft 20 is inserted with pressure into the mounting hole 13b of the turntable 13. The surface vibration absorber layer 40 is formed last.

Figure 3A:
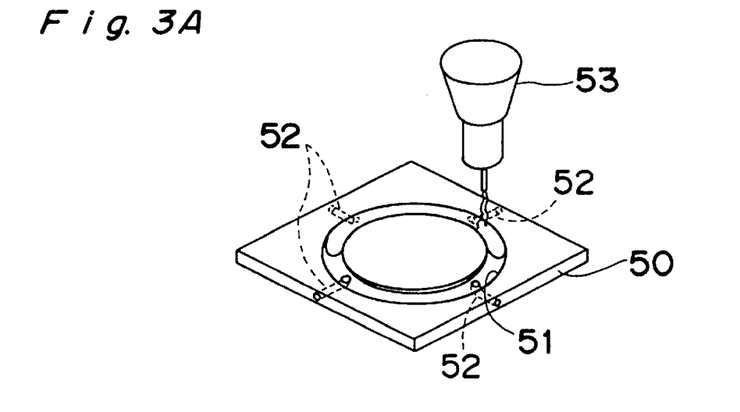
FIGS. 3A, 3B, and 3C are diagrams representing a sequence of procedures when a surface vibration absorber layer is formed.
Figure 3B:
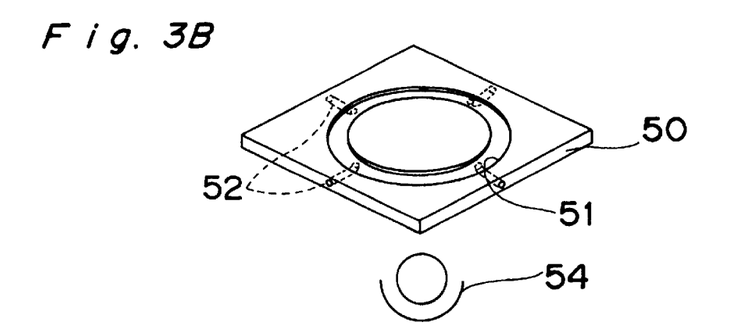
Figure 3C:
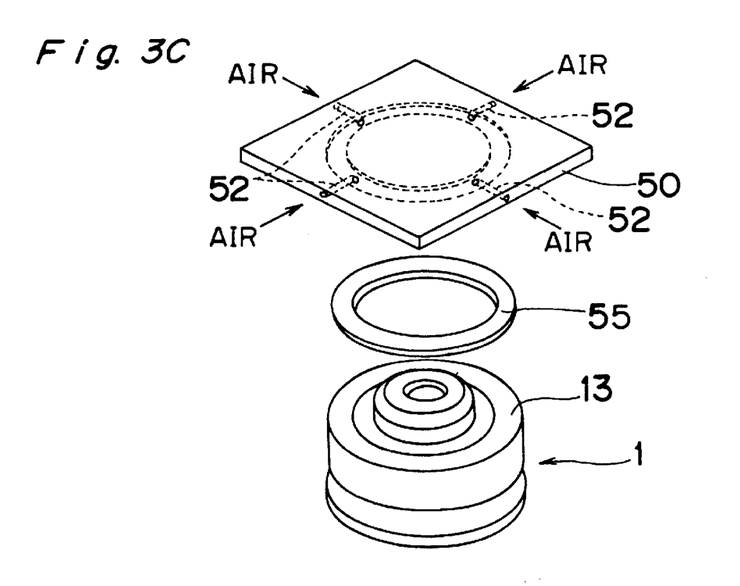

For forming the surface vibration absorber layer 40, a glass mold 50 with a ring-shaped groove 51 formed thereon is prepared, as shown in FIG. 3A. The bottom of the groove 51 is flat. The glass mold 50 has a function of transmitting ultraviolet rays therethrough as described later. The groove 51 in the glass mold 50 is formed to conform to the outline of the surface vibration absorber layer 40. Four gas injection holes 52 are also formed in the glass mold 50 to communicate with a bottom part of the groove 51 from four directions. A predetermined amount of resin liquid of photosetting properties and elasticity is filled into the ring-shaped groove 51 of the prepared glass mold 50 from a gun nozzle 53. Subsequently, a shown in FIG. 3B, a light source 54 for emitting ultraviolet rays is set at a rear face of the glass mold 50 (a face where the groove 51 is not formed), and ultraviolet rays are emitted to the resin liquid from the light source 54. As a result of this, only a contact face of the resin liquid with the groove 51 is hardened, whereas a front face and the interior of the resin liquid are left almost without being hardened. The glass mold 50 is then turned upside down as shown in FIG. 3C and registered over the spindle motor 1. In this state, a gas such as air is inserted from the gas insertion holes 52 thereby to transfer a half-set, molded body 55 formed inside the groove 51 to a predetermined position of the turntable 13. The ring-shaped molded body 55 at this time is nearly uniform in thickness.

Figure 4:
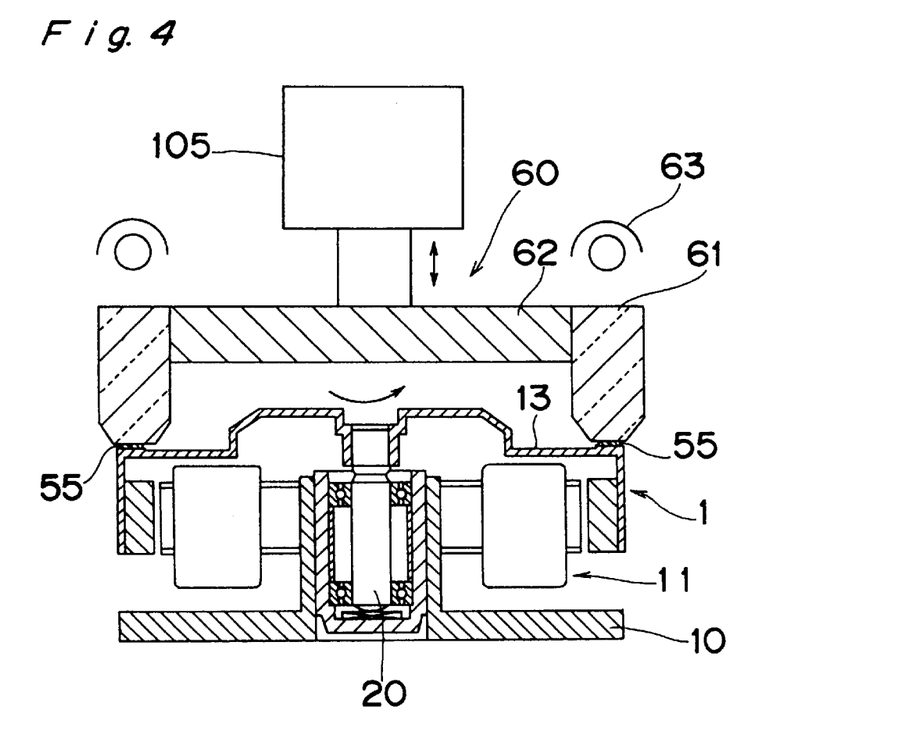
FIG. 4 is a sectional partial view of a method of forming the surface vibration absorber layer in a thickness corresponding to the amount of a surface vibration.

After the ring-shaped molded body 55 is transferred onto the turntable 13, the spindle motor 1 is positioned below a press 60 for setting of the body 55 by ultraviolet rays. The press 60 has an annular reference rotary disk 61 which is made of glass and has a lift part 62 movable up and down at an inner peripheral face thereof. A light source 63 is arranged above the reference rotary disk 61 to emit ultraviolet rays. The reference rotary disk 61 is so adjusted as to hold a surface vibration thereof within a tolerance zone.

The spindle motor 1 after positioned below the press 60 is driven thereby to turn the turntable 13 while the modeled body 55 is pressed, by at least 100 μm as one example, by the reference rotary disk 61 while the reference rotary disk 61 is rotated by rotating device 105. The pressing amount is determined based on the amount of the surface vibration of the turntable 13. When the average amount of the surface vibration is 100 μm, the pressing amount is preferably 100 μm. As a result, if the spindle motor causes a surface vibration at this time, this leads to a surface vibration in the surface of the turntable 13. However the surface vibration is lessened because of an upper face of the surface vibration absorber layer 40 is pressed by the reference rotary disk 61. Simultaneously with the rotation of the turntable 13, ultraviolet rays are emitted from the light source 63 to set the molded body 55, whereby the surface vibration absorber layer 40 is formed which is tightly adhered to the turntable 13.

In the embodiment, even if the turntable 13 vibrates during the rotation, the annular molded body 55 is set/hardened while the turntable 13 is pressed by the reference rotary disk 61 having the surface vibration thereof limited within the tolerance zone. Therefore, the obtained surface vibration absorber layer 40 becomes a ring having different thicknesses corresponding to the amounts of the surface vibration of the turntable 13. Accordingly, the amounts of the surface vibration of the turntable 13 are controlled within the tolerance zone.

Figure 5:
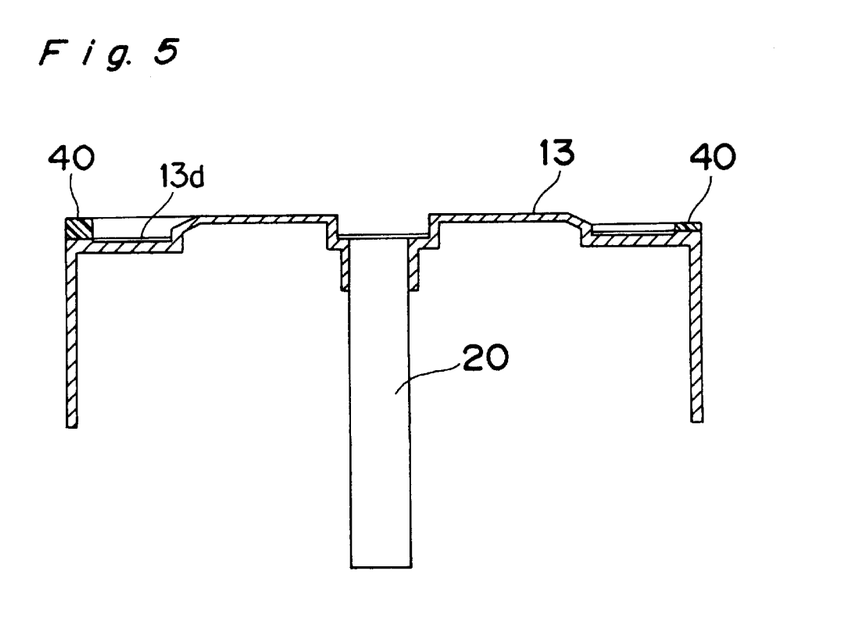
FIG. 5 is a sectional view of the surface vibration absorber layer formed corresponding to the surface vibration.

For example, as shown in FIG. 5, supposing that the turntable 13 is press-fitted to the rotary shaft 20 with a slight inclination leftward and consequently accompanied with a surface vibration, the obtained surface vibration absorber layer 40 is different in thickness at the right and left ends thereof in FIG. 5. Consequently, as illustrated in FIG. 5, the upper surface of vibration absorber layer 40 is not parallel to top surface 13d of the turntable. An optical disk loaded on the surface vibration absorber layer 40 has its vibration reduced. The spindle motor 1 can be adjusted so that its vibrations are reduced even when the components of the spindle motor 1 are not so accurately processed or assembled. Although each component of the spindle motor was conventionally required to have a processing accuracy and a mounting accuracy of 2–5 μm or lower in order to hold the amount of the surface vibration of the turntable at 20 μm or smaller, the present embodiment allows the components to be of 20–30 μm process and/or mounting accuracies, thus lowering manufacturing and assembling costs of the components. The spindle motor 1 is hence manufactured inexpensively.

Other embodiments of the present invention will be depicted.

The surface vibration absorber layer may be formed by applying a film in different thicknesses corresponding to the amounts of the surface vibration. For this purpose, as indicated in FIG. 6, a film coating device that can change a film thickness corresponding to the amounts of a surface vibration is arranged over the finished spindle motor 1.

Figure 6:
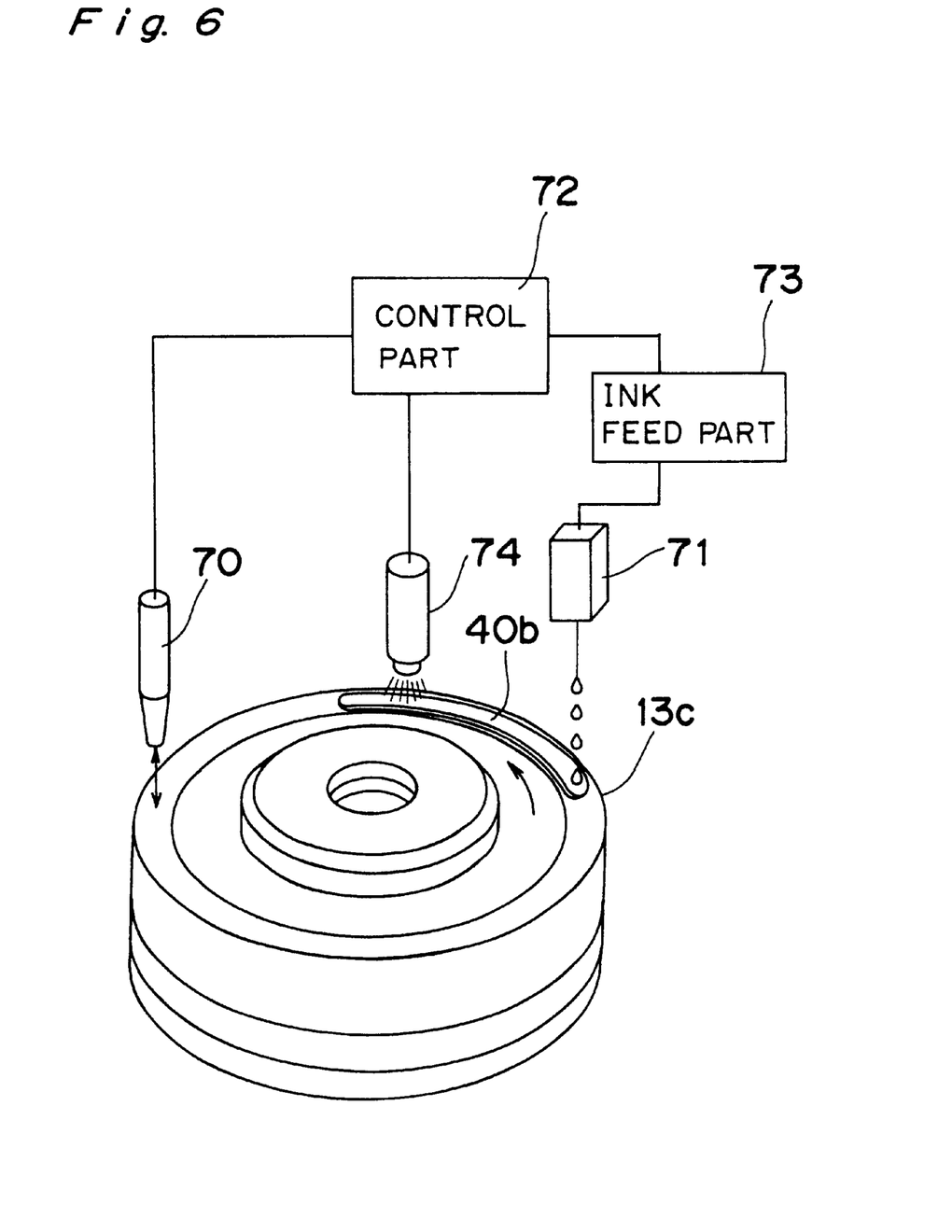
FIG. 6 is a block diagram showing a constitution according to a different embodiment of the present invention.

The film coating device in FIG. 6 has a photosensor 70 for measuring the amounts of the surface vibration, an inkjet nozzle 71, a control part 72, an ink feed part 73, and an ultraviolet lamp 74.

The photosensor 70 faces and is spaced a predetermined distance to the peripheral edge 13c of the turntable 13 and is capable of detecting a change of the distance to the peripheral edge 13c. The photosensor 70 is connected to the control part 72 comprising, e.g., a microcomputer, and the control part 72 calculates the amount of the surface vibration of the turntable 13 at each rotating position from the measuring results of the photosensor 70 with a predetermined sampling timing when the turntable 13 is rotated. A reference plane without the surface vibration is determined based on the calculation result. The ink feed part 73 and ultraviolet lamp 74 are also connected to the control part 72.

The inkjet nozzle 71 is separated, for example, 180° in the rotating direction from the photosensor 70. The inkjet nozzle 71 discharging an elastic resin ink capable of being set by ultraviolet rays can control an application thickness of the ink optionally. The ultraviolet lamp 74 is arranged at the lower stream side of the inkjet nozzle 71 in the rotating direction, and emits ultraviolet rays to the peripheral edge 13c. The ink feed part 73 is connected to the inkjet nozzle 71. The ink; feed part 73 is constituted of, for instance, a discharge pump capable of discharging a constant discharge volume of ink for each time and a tank storing the ink. An optional amount of ink can be supplied to the inkjet nozzle 71 by adjusting the discharging number of times from the discharge pump. The control part 72 feeds, with a predetermined timing, a control signal for controlling the discharging number of times based on the determined reference plane to the ink feed part 73.

According to the thus-constituted embodiment, first, the spindle motor 1 is arranged at the predetermined position below the film coating device and driven for rotation. Then the photosensor 70 measures the amount of the surface vibration of the turntable for the entire periphery of the turntable. When the amount of the surface vibration is measured, the control part 72 determines the reference plane which will cause no surface vibration. Next, the control part feeds the control signal for controlling the discharge number of times, to the ink feed part 73 until the whole periphery of the edge 13c becomes the reference plane. As a result, in response to this signal, the ink feed part 73 supplies a predetermined amount of ink to the inkjet nozzle 71, so that the inkjet nozzle 71 discharges the ink until the reference plane is achieved on the edge 13c. Then, an annular application film 40b is formed on the peripheral edge 13c. The coated film 40b is hardened by the ultraviolet lamp 74 and then dried, whereby the surface vibration absorber layer is obtained.

The film may not be formed at one time, but can be repeatedly applied and immediately, dried (hardened).

Since the surface vibration absorber layer is formed by applying/coating the resin, a number of processes for forming the surface vibration absorber layer is reduced and therefore the surface vibration absorber layer is obtained at lower cot with higher accuracy. Furthermore, a processing time is greatly shortened.

Figure 7:
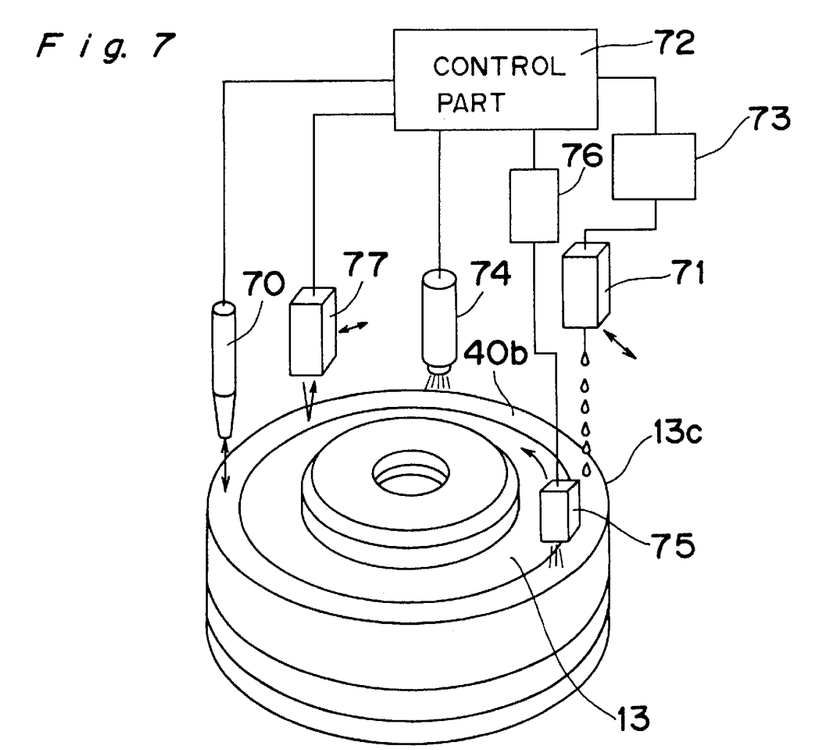
FIG. 7 is a block diagram showing a constitution according to another embodiment of the present invention.

In a different embodiment shown in FIG. 7, the surface vibration is measured independently of the coating process.

The film coating device of FIG. 7 is provided with the photosensor 70, inkjet nozzle 71, control part 72, ink feed part 73, ultraviolet lamp 74, a distinction ink application nozzle 75, a distinction ink feed part 76, and an image recognition sensor 77. These parts and members are connected to control part 72. The inkjet nozzle 71 and image recognition sensor 77 are respectively rotatable along the peripheral edge 13c of the turntable as indicated by arrows.

The distinction ink feed part 76 supplies a predetermined amount of distinction ink to the distinction ink application nozzle 75 in accordance with an ink feed signal sent from the control part 72 based on the determined reference plane. Thus, the application nozzle 75 forms on the peripheral edge 13c a dark-and-bright pattern corresponding to the distances from the determined reference plane. Thus, the image recognition sensor 77 distinguishes the formed dark-and-bright pattern and then, sends the distinction result to the control part 72. On the basis of the distinction result, the control part 72 feeds a control signal for controlling the discharging number of times to the ink feed part 73. Accordingly, the inkjet nozzle 71 forms a film of thicknesses corresponding to the dark-and-bright pattern, i.e., distances from the reference plane.

In the embodiment, the amount of the surface vibration is measured by the photosensor 70 during the rotation of the spindle motor 1. The reference plane is determined in accordance with the amount of the surface vibration. Then, the distinction ink application nozzle 75 applies the distinction ink in accordance with the distances to the peripheral edge 13c from the determined reference plane thereby to form the dark-and-bright pattern on the peripheral edge 13c. Then, the spindle motor 1 is stopped, and the image recognition sensor 77 is turned along above the peripheral edge 13c. Thus, the control part 72 distinguishes the dark and bright of the dark-and-bright pattern, and then, sends the control signal corresponding to the dark and bright of the pattern to the ink feed part 73. Next, the inkjet nozzle 71 is turned along the peripheral edge 13c. As a result, a film of thicknesses corresponding to the distances from the reference plane is formed on the peripheral edge 13c. Finally, the spindle motor 1 is driven for rotation to set and dry the film by the ultraviolet lamp 74. The surface vibration absorber layer is thus formed on the peripheral edge 13c.

The spindle motor 1 may be (driven for rotation) rotated at the time of the image recognition and the film formation.

Since the spindle motor 1 is stopped when the film is coated in the above embodiment, the application liquid is prevented from sputtering out from the peripheral edge 13c which would be caused when the spindle motor is driven for rotation in the application. Therefore, the film is formed more accurately.

According to another embodiment, a thermosetting resin such as acrylic resin can be used, in place of the photosetting resin. In this case, the light source is replaced with a heater and the heater is set at the mold and press, etc.

Figure 8:
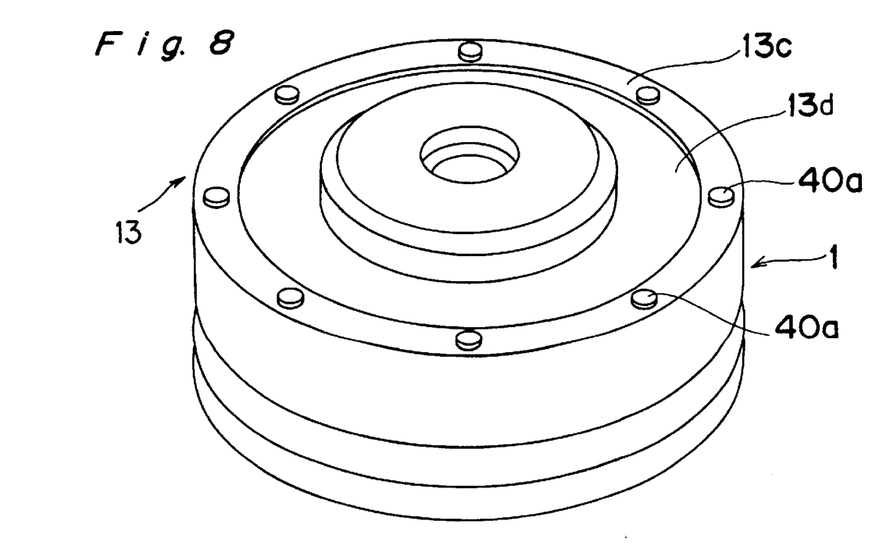
FIG. 8 is a perspective view corresponding to FIG. 1 of yet another embodiment.

As indicated in FIG. 8, according to yet another embodiment, surface vibration absorber parts 40a may be formed by a plurality of parts disposed apart distances so that there are at least three parts along the peripheral edge 13c of the turntable 13. In addition, the surface vibration absorber parts 40a are formed so that they have different heights (thicknesses) corresponding to the amounts of the surface vibration.

Figure 9:
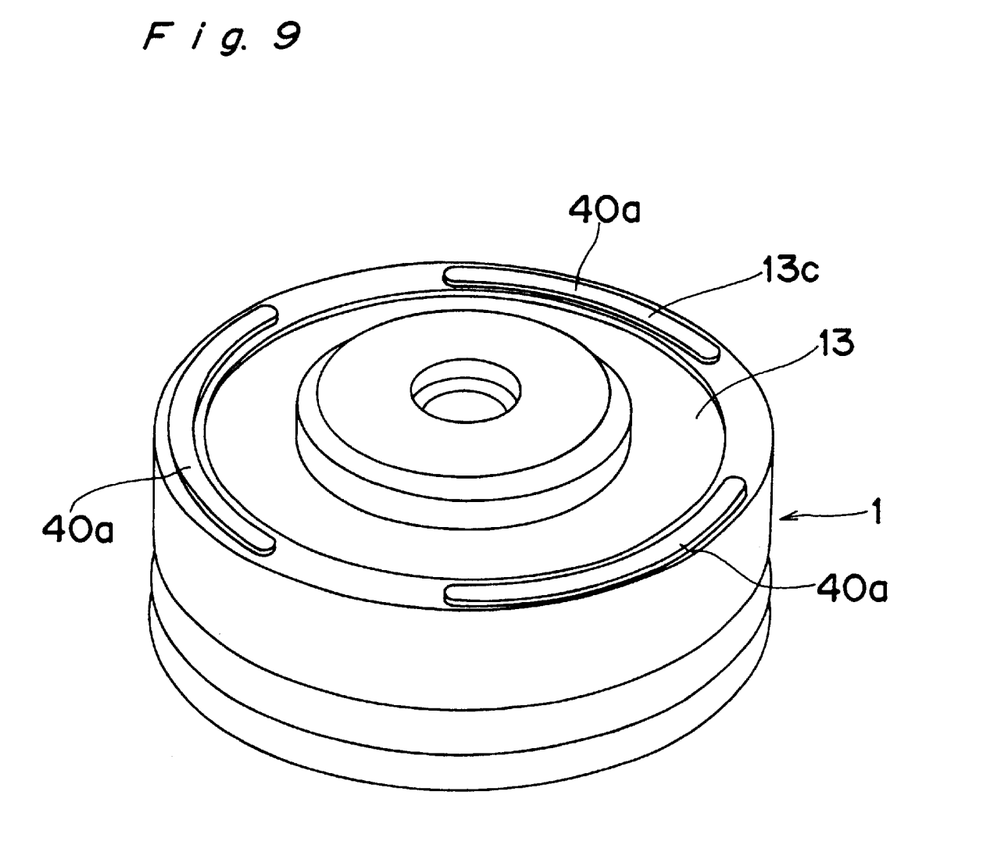
FIG. 9 is a perspective view corresponding to FIG. 1 of still another embodiment.

FIG. 9 is a perspective view corresponding to FIG. 1 of still another different embodiment in which the surface vibration absorber parts 40a are constituted of three island-shaped parts which are evenly spaced from one another.

Figure 10:
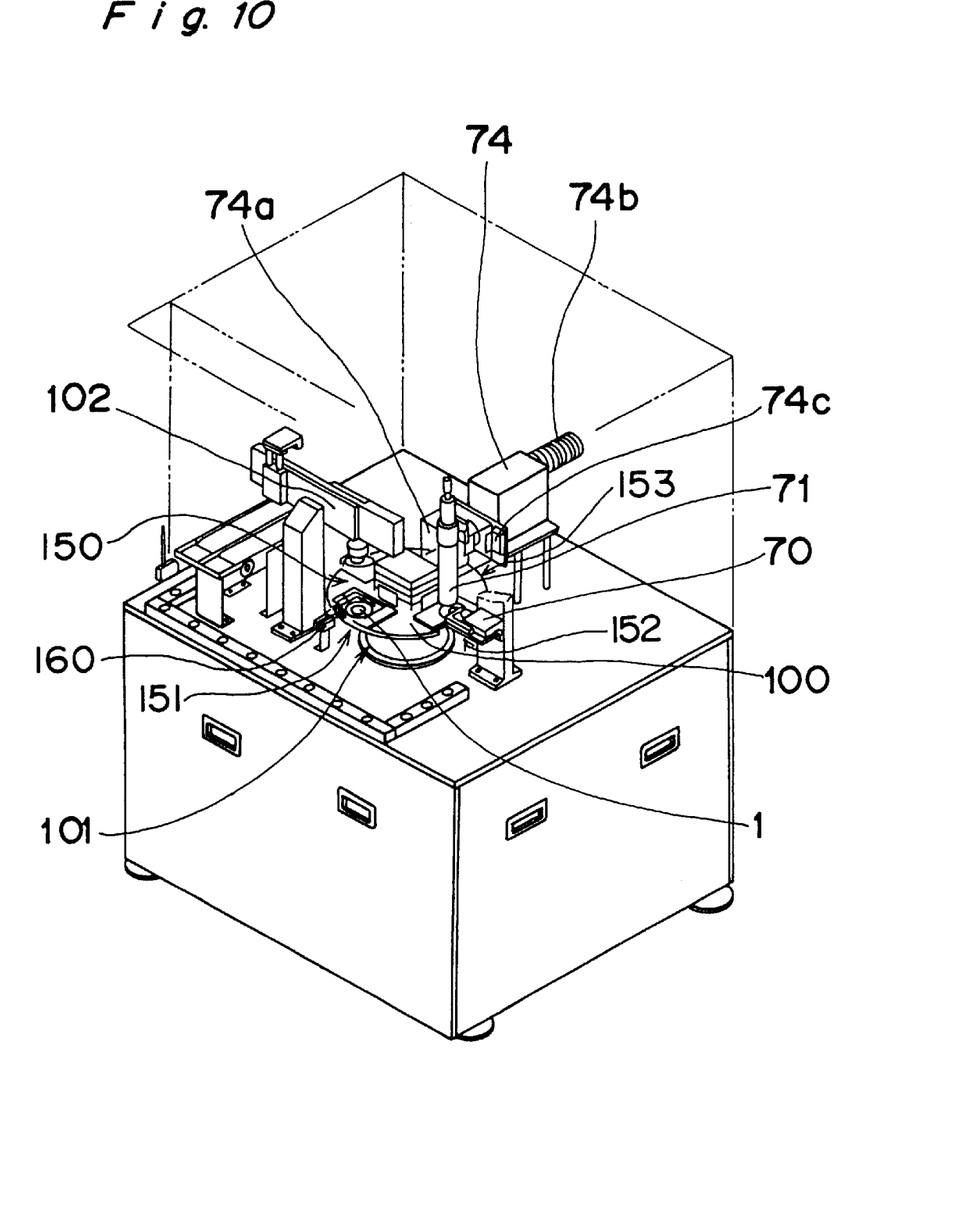
FIG. 10 is a perspective view of a manufacturing device for manufacturing the rotary driving device according to one embodiment of the present invention.

Next, one example of a manufacturing device for manufacturing the rotary driving device according to one embodiment of the present invention is shown in FIG. 10 which can perform the manufacturing processes described above. The manufacturing device has an index table 100 on which four spindle motors 1 can be arranged in four stations. The stations are constituted of a loading and unloading station 150 where the spindle motors 1 are loaded/transferred in the station 150 of the index table 100 and unloaded/transferred from the station 150 by a loading and unloading device 102. A connector connecting station 151 is used to connect a connector for supplying electric power to the spindle motor 1 through a connecting device 160 so as to rotate the turntable 13. A measuring station 152 is used to measure the amount of the surface vibration of the turntable 13 through the photosensor 70 or laser displacement gauge. This measuring occurs while the turntable 13 is rotated with the electric power supplied to the motor 1 via the connector from the index table side. Liquid is applied to the turntable 13 by a dispenser such as the inkjet nozzle 71. An UV set station 153 is used to set the formed surface vibration absorber parts 40a on the turntable 13 with ultraviolet rays from the ultraviolet lamp 74. Reference numeral 74a denotes an UV shielding cover for shielding ultraviolet rays which are emitted to unnecessary portions or members. Numeral 74b denotes a duct for discharging heat caused by the ultraviolet lamp 74, and 74c denotes a cylinder for sliding the cover 74a between an UV shielding position and a retreat position. The index table 100 is driven for rotation by a driving motor 101 so as to intermittently rotate the index table 1100 by 45 degrees to stop at each station.

One example of the surface vibration absorber parts 40a will be described below with reference to FIGS. 11–14. The ordinate axis of each graph indicates the positions in the height direction of the turntable 13 and the abscissa axis indicates the positions (angles) on the turntable 13 in its peripheral direction. The length from 0 to 360 degrees for one rotation of the turntable 13 is 85 mm.

Figure 11:
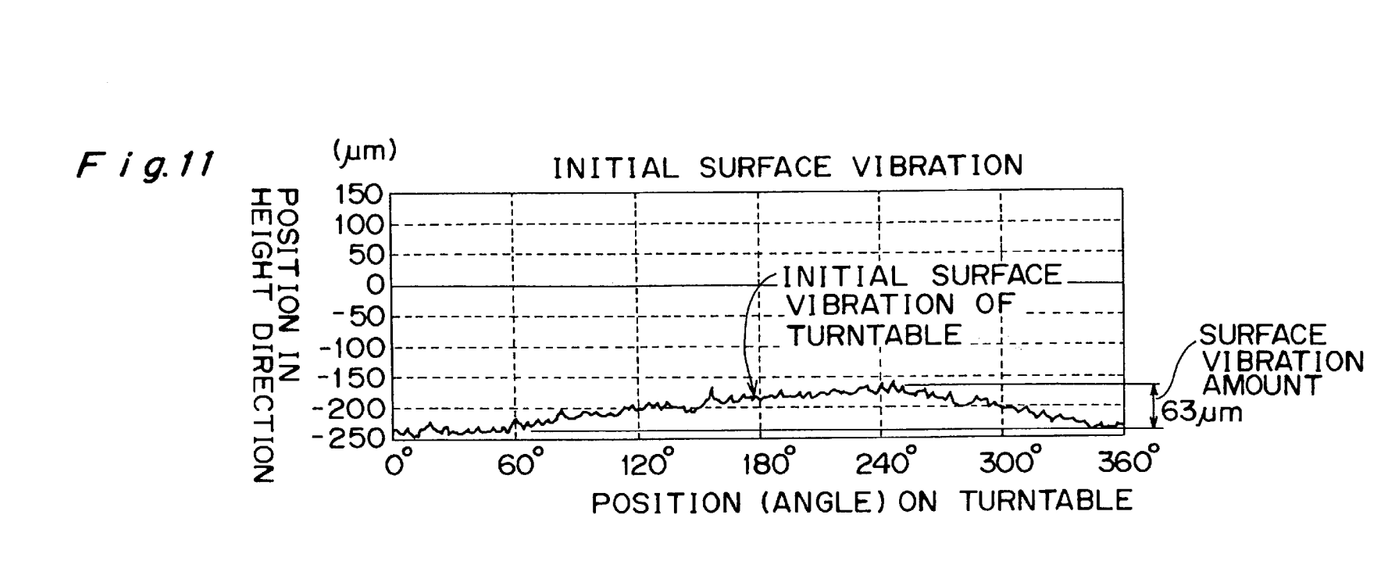
FIG. 11 if a graph showing one example of an initial surface vibration of the turntable before forming the absorber part.

FIG. 11 is a graph showing one example of an initial surface vibration of the turntable 13 before forming the absorber part 40a. In this initial state, the amount of the surface vibration is 63 μm.

Figure 12:
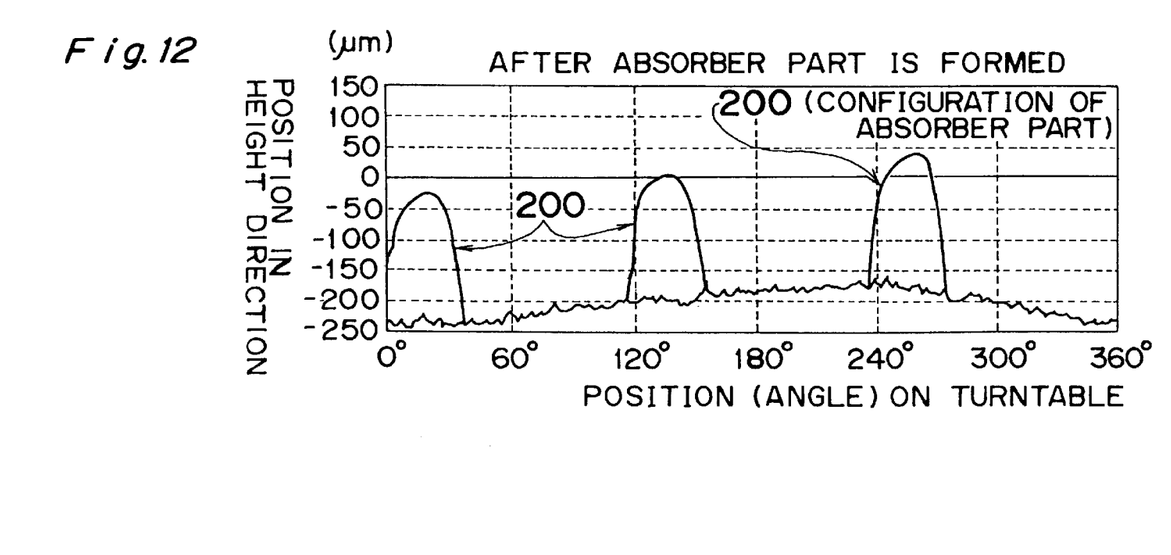
FIG. 12 is a graph showing one example of a surface vibration of the turntable in a state where three island-shaped absorber parts are formed thereon before adjustment.

FIG. 12 is a graph showing one example of a surface vibration of the turntable 13 in a state where three island-shaped absorber parts 40a are formed on the turntable 13 in FIG. 11 before adjustment. Reference numeral 200 denotes one island-shaped absorber part 40a. Although it seems that the configuration of each part 40a is vertically elongated, the configuration of the part 40a is laterally elongated because the scales of the ordinate axis and the abscissa axis are greatly different from each other. The three island-shaped parts 40a are spaced at equal intervals.

Figure 13:
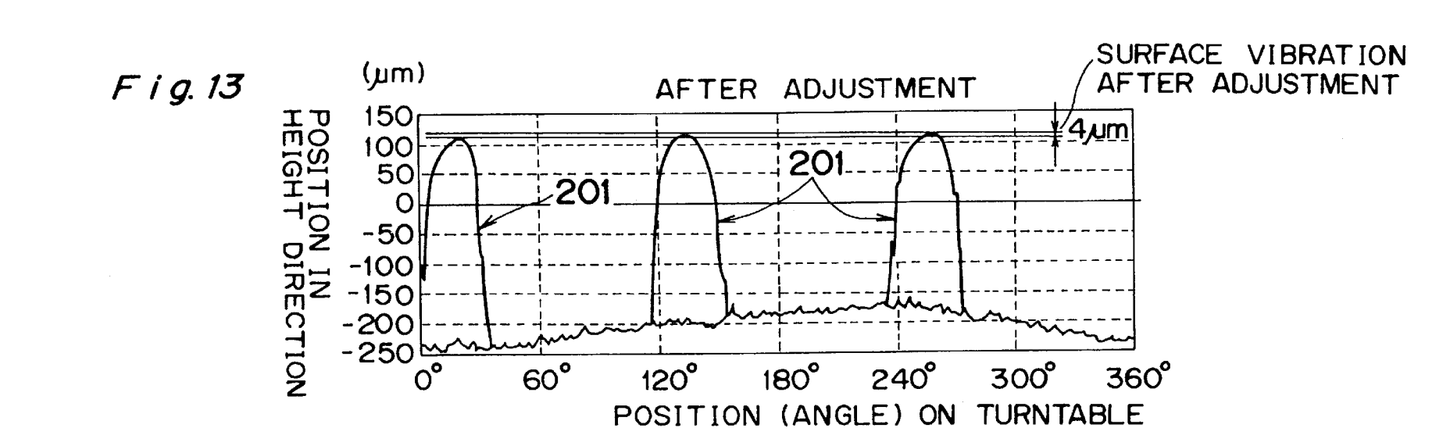
FIG. 13 is a graph showing one example of a surface vibration of the turntable after adjustment of the formed absorber part is carried out.

FIG. 13 is a graph showing one example of a surface vibration of the turntable 13 after adjustment of the formed absorber part 40a is carried out. That is, after liquid is dropped on the turntable 13, the surface vibration is adjusted within a tolerance zone. Reference numeral 201 denotes one island-shaped absorber part 40a. In this state where the part is wet and not dried, the amount of the surface vibration is 4 μm.

Figure 14:
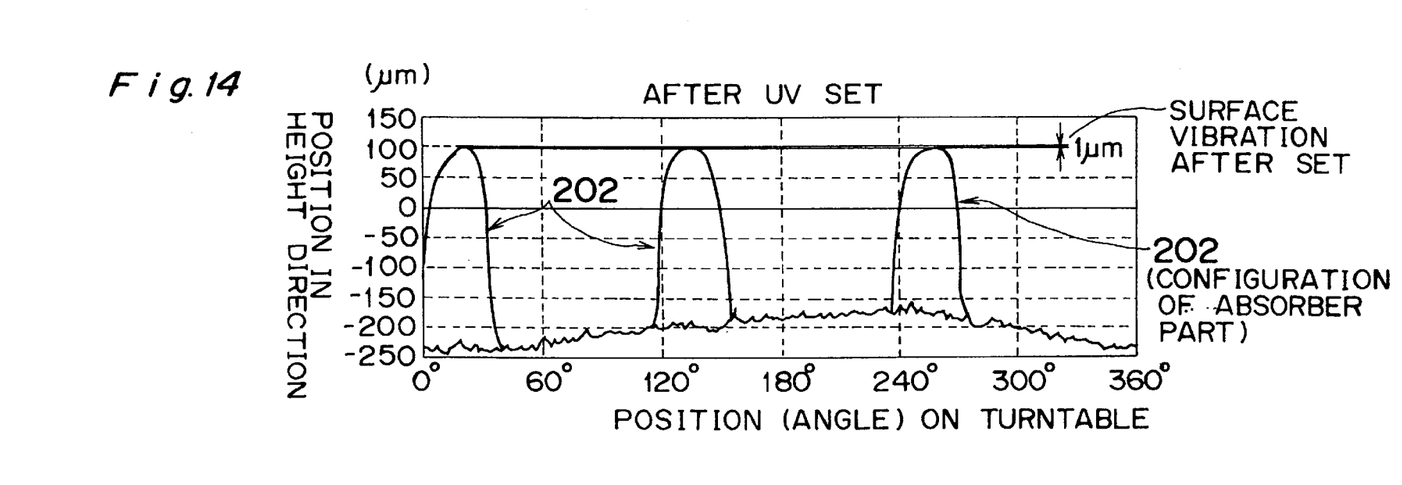
FIG. 14 is a graph showing one example of a surface vibration in a state where the adjusted absorber part is set with ultraviolet rays.

FIG. 14 is a graph showing one example of a surface vibration in a state where the adjusted absorber part 40a is set with ultraviolet rays. Reference numeral 202 denotes one island-shaped absorber part 40a. In this state, the amount of the surface vibration is 1 μm.

Therefore, as shown in FIGS. 11–14, the amount of the surface vibration of the turntable 13 can be decreased from 63 μm to 1 μm by the island-shaped absorber part 40a.

One example of the width of the absorber part 40a in diameter is 1–2 mm in a 6-inch turntable.

Figure 15:
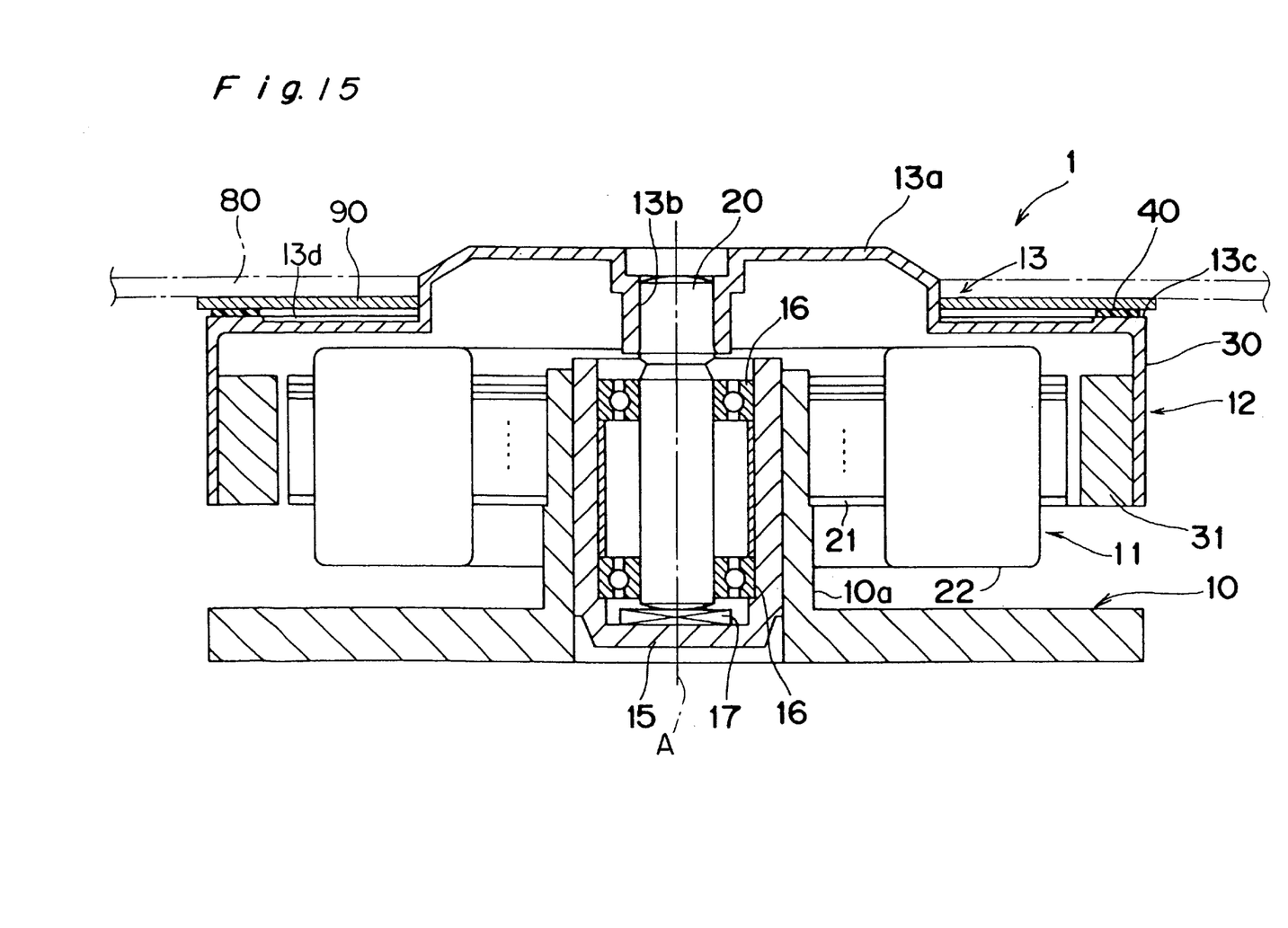
FIG. 15 is a perspective view corresponding to FIG. 2 of another embodiment.

FIG. 15 is a perspective view corresponding to FIG. 2 of another different embodiment of the present invention. In this embodiment, a plate 70 on which the optical disk 80 can be placed is mounted on the absorber part 40a so as to increase a contact area where the optical disk 80 contacts the turntable side. That is, the plate 70 having upper and lower surfaces capable of decreasing the surface vibration into a tolerance zone is placed on the absorber part 40a. The plate is then adhered to the turntable 13 via the absorber part 40a and an adhesive part, or another adhesive agent different from the part 40a in material. Thus, the optical disk 80 is placed on the plate 70 while the contact area between them can be increased.

In the embodiments, when the bearings are fluid bearings, it is necessary to set the absorber part while the turntable 13 is rotating so as to locate the rotary shaft 20 in a predetermined position.

According to the rotary driving device and manufacturing method of the present invention, the surface vibration absorber part is formed on the turntable. Therefore, the surface vibration can be restricted within the tolerance zone even if individual components included in the turntable and the driving part are not precessed and assembled so accurately. The surface vibration can be restricted at low cost.

Although the present invention has been fully described in connection with the preferred embodiments thereof with references to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A device for rotating an object, comprising:
   a rotary turntable comprising a top surface;
   a driving part arranged to rotate said turntable; and
   a surface vibration absorber part including an upper surface, said surface vibration absorber part being located on said top surface and having a thickness which varies in a circumferential direction and as a function of surface vibrations of said rotary turntable;
   wherein said top surface is not parallel to said upper surface.

2. The device of claim 1, wherein:
   said top surface comprises a peripheral edge; and
   said surface vibration absorber part is located at said peripheral edge.

3. The device of claim 1, wherein:
   said top surface comprises a data recording medium-receiving surface; and
   said driving part comprises a motor.

4. The device of claim 3, wherein:

said surface vibration absorber part comprises a slide-preventing part.

5. The device of claim 1, wherein:

said surface vibration absorber part comprises a molded elastic resin body having a predetermined shape.

6. The device of claim 5, wherein:

said body comprises a liquid-applied coating film.

7. The device of claim 5, wherein:

said top surface comprises a peripheral edge; and said body is a ring located at said peripheral edge.

8. The device of claim 5, wherein:

said top surface comprises a peripheral edge; and said surface vibration absorber part comprises at least two separate parts located at said peripheral edge.

9. The device of claim 1, wherein:

said surface vibration absorber part comprises a liquid-applied coating film.

10. The device of claim 1, wherein:

said top surface comprises a peripheral edge; and said surface vibration absorber part is a ring located at said peripheral edge.

11. The device of claim 1, wherein:

said top surface comprises a peripheral edge; and said surface vibration absorber part comprises at least two separate parts located at said peripheral edge.

12. The device of claim 1, further comprising:

a contact area-increasing plate mounted on said surface vibration absorber part.

13. A device for rotating an object, comprising:

a rotary turntable comprising a top surface and having an axis of rotation;

a driving part arranged to rotate said turntable; and a shift absorber part which absorbs a shift of said top surface in a direction of said axis of rotation during rotation, said shift absorber part including an upper surface, said shift absorber part being located on said top surface and having a thickness which varies in a circumferential direction;

wherein said top surface is not parallel to said upper surface.

14. The device of claim 13, wherein:

said top surface comprises a peripheral edge; and said shift absorber part is located at said peripheral edge.

15. The device of claim 13, wherein:

said top surface comprises a data recording medium-receiving surface; and said driving part comprises a motor.

16. The device of claim 15, wherein:

said shift absorber part comprises a slide-preventing part.

17. The device of claim 13, wherein:

said shift absorber part comprises a molded elastic resin body having a predetermined shape.

18. The device of claim 17, wherein:

said body comprises a liquid-applied coating film.

19. The device of claim 17, wherein:

said top surface comprises a peripheral edge; and said body is a ring located at said peripheral edge.

20. The device of claim 17, wherein:

said surface comprises a peripheral edge; and said shift absorber part comprises at least two separate parts located at said peripheral edge.

21. The device of claim 13, wherein:

said shift absorber part comprises a liquid-applied coating film.

22. The device of claim 13, wherein:

said top surface comprises a peripheral edge; and said shift absorber part is a ring located at said peripheral edge.

23. The device of claim 13, wherein:

said top surface comprises a peripheral edge; and said shift absorber part comprises at least two separate parts located at said peripheral edge.

24. The device of claim 13, further comprising:

a contact area-increasing plate mounted on said shift absorber part.

25. A device for rotating an object, comprising:

a rotary turntable having a top surface and an axis of rotation inclined relative to said top surface at an oblique angle;

a driving part arranged to rotate said turntable about said axis of rotation; and a surface vibration absorber part located on said top surface and having a thickness which varies in a circumferential direction and as a function of surface vibrations caused by rotation of said turntable about said axis of rotation inclined relative to said top surface at said oblique angle whereby an upper surface of said surface vibration absorber part is not parallel to a lower surface of said surface vibration absorber part.

26. The device of claim 25, wherein:

said top surface comprises a peripheral edge; and said surface vibration absorber part is located at said peripheral edge.

27. The device of claim 25, wherein:

said top surface comprises a data recording medium-receiving surface; and said driving part comprises a motor.

28. The device of claim 27, wherein:

said surface vibration absorber part comprises a slide-preventing part.

29. The device of claim 25, wherein:

said surface vibration absorber part comprises a molded elastic resin body having a predetermined shape.

30. The device of claim 29, wherein:

said body comprises a liquid-applied coating film.

31. The device of claim 29, wherein:

said top surface comprises a peripheral edge; and said body is a ring located at said peripheral edge.

32. The device of claim 29, wherein:

said top surface comprises a peripheral edge; and said surface vibration absorber part comprises at least two separate parts located at said peripheral edge.

33. The device of claim 25, wherein:

said surface vibration absorber part comprises a liquid-applied coating film.

34. The device of claim 25, wherein:

said top surface comprises a peripheral edge; and said surface vibration absorber part is a ring located at said peripheral edge.

35. The device of claim 25, wherein:

said top surface comprises a peripheral edge; and said surface vibration absorber part comprises at least two separate parts located at said peripheral edge.

36. The device of claim 25, further comprising:

a contact area-increasing plate mounted on said surface vibration absorber part.

37. A device for rotating an object, comprising:

a rotary turntable comprising a top surface and having an axis of rotation inclined relative to said top surface at an oblique angle;

a driving part arranged to rotate said turntable about said axis of rotation; and a shift absorber part which absorbs a shift of said top surface in a direction of said axis of rotation during rotation, said shift being caused by rotation of said turntable about said axis of rotation inclined relative to said top surface at said oblique angle, said shift absorber part being located on said top surface and having a thickness which varies in a circumferential direction whereby an upper surface of said shift absorber part is not parallel to a lower surface of said shift absorber part.

38. The device of claim 37, wherein:

said top surface comprises a peripheral edge; and said shift absorber part is located at said peripheral edge.

39. The device of claim 37, wherein:

said top surface comprises a data recording medium-receiving surface; and said driving part comprises a motor.

40. The device of claim 39, wherein:

said shift absorber part comprises a slide-preventing part.

41. The device of claim 37, wherein:

said shift absorber part comprises a molded elastic resin body having a predetermined shape.

42. The device of claim 41, wherein:

said body comprises a liquid-applied coating film.

43. The device of claim 41, wherein:

said top surface comprises a peripheral edge; and said body is a ring located at said peripheral edge.

44. The device of claim 41, wherein:

said top surface comprises a peripheral edge; and said shift absorber part comprises at least two separate parts located at said peripheral edge.

45. The device of claim 37, wherein:

said shift absorber part comprises a liquid-applied coating film.

46. The device of claim 37, wherein:

said top surface comprises a peripheral edge; and said shift absorber part is a ring located at said peripheral edge.

47. The device of claim 37, wherein:

said top surface comprises a peripheral edge; and said shift absorber part comprises at least two separate parts located at said peripheral edge.

48. The device of claim 37, further comprising:

a contact area-increasing plate mounted on said shift absorber part.

* * * * *

UNITED STATES PATENT AND TRADEMARK OFFICE
CERTIFICATE OF CORRECTION

PATENT NO. : 5,995,480
DATED : November 30, 1999
INVENTOR(S) : Hiroyuki NAKA et al.

It is certified that error appears in the above-identified patent and that said Letters Patent is hereby corrected as shown below:

Title Page:
[30] Foreign Application Priority Data
    Jan. 9, 1996 [JP] Japan . . . . . . 8-001225

Signed and Sealed this

Twenty-second Day of August, 2000

Attest:

Q. TODD DICKINSON

*Attesting Officer*  *Director of Patents and Trademarks*